United States Patent [19]

Gras et al.

[11] 4,242,248
[45] Dec. 30, 1980

[54] STORAGE-STABLE BAKING LACQUERS PREPARED FROM POLYISOCYANATES BLOCKED WITH CYCLIC AMIDINES

[75] Inventors: Rainer Gras, Herne; Johann Obendorf, Dorsten; Elmar Wolf, Herne, all of Fed. Rep. of Germany

[73] Assignee: Chemische Werke Huls AG, Herne, Fed. Rep. of Germany

[21] Appl. No.: 948,625

[22] Filed: Oct. 3, 1978

[30] Foreign Application Priority Data

Oct. 5, 1977 [DE] Fed. Rep. of Germany ....... 2744782

[51] Int. Cl.³ ............................................. C08G 18/10
[52] U.S. Cl. ........................ 260/31.2 N; 260/32.8 N; 260/33.6 UB; 260/37 N; 525/124; 528/45
[58] Field of Search ............ 260/31.2 N, 32.8 N, 260/33.6 UB, 37 N; 525/124; 528/45

[56] References Cited

U.S. PATENT DOCUMENTS

| | | | |
|---|---|---|---|
| 4,101,473 | 7/1978 | Lander | 528/45 |
| 4,150,211 | 4/1979 | Müller et al. | 528/45 |

*Primary Examiner*—Maurice J. Welsh
*Attorney, Agent, or Firm*—Oblon, Fisher, Spivak, McClelland & Maier

[57] ABSTRACT

Baking lacquers on the basis of a blend of hydroxy-group-containing polymers, blocked polyisocyanates and organic solvents which comprise 40–70 wt. % hydroxy-group-containing polymers with hydroxy numbers between 40 and 240 and polyisocyanates blocked with cyclic amidines of the formula:

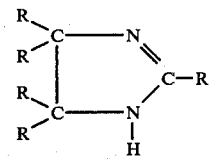

wherein R are equal or different substituents selected from the group of hydrogen, alkyl-, cycloalkyl-, aralkyl- and aryl radicals, whereby the components are used in such amounts that 0.8 to 1.2 NCO-group equivalents are applied for each hydroxy group equivalent, 0–2 wt. % cross-linking catalyst, 30–60 wt. % organic solvent or solvent mixture, wherein the percentages of polymer, catalyst and solvent add up to 100. Pigments, colorants, flowing agents, gloss improvers, antioxidants and heat stabilizers may also be added. The lacquers are used for coil-coating lacquering in weather resistant single and double layer lacquering.

7 Claims, No Drawings

STORAGE-STABLE BAKING LACQUERS PREPARED FROM POLYISOCYANATES BLOCKED WITH CYCLIC AMIDINES

BACKGROUND OF THE INVENTION

1. Field of the Invention

The present invention deals with baking lacquers for single and double layer lacquering on the basis of a blend of hydroxy-group-containing polymers, blocked polyisocyanates and organic solvents.

2. Description of the Prior Art

For the production of mixtures of polyisocyanates and polyhydroxy-compounds that are storable at normal temperatures, it is known to use such polyisocyanates which reactive groups are blocked by reaction with nonfunctional groups and that are generally described as blocked, capped or masked polyisocyanates. Such products are described in Liebig's Annalen Vol. 562, pp 205–229. Through the influence of higher temperatures, they dissociate back into their original materials, whereby the, now freed, isocyanate groups can, on their part, react with the polyhydroxy-compounds that are present in the reaction mixture.

Such a single-component baking lacquer system that is storage-stable at room temperature, for example, consists of an ε-caprolactam-blocked adduct of 3-isocyanatomethyl-3,5,5-trimethyl-cyclohexyl isocyanate, dissolved in a high-boiling lacquer solvent, and a hydroxyl-group containing polyester on the basis of predominantly aromatic dicarboxylic acids and a mixture of diols and triols and is described in the DT-OS (German Patent Disclosure) No. 23 46 818. But for certain applications, the hardening speeds of such a system are too slow. Although it is possible to considerably increase the hardening speeds with such catalysts as tertiary amines or organic tin compounds, such additives influence, especially in the presence of compounds that are capable of reacting with isocyanates, the capped polyisocyanates—even at low temperatures, in such a way, that they cause the splitting-off of the monofunctional compound, even at normal temperature and thus render the mixture unstable.

SUMMARY OF THE INVENTION

It has now been found, surprisingly, that it is possible to reduce, not only the hardening period, but also the hardening temperature of the baking lacquers on the basis of a mixture of hydroxyl-group containing polymers, blocked polyisocyanates and organic solvents as well as the usual lacquer additives, if such baking lacquers comprise:

a. 40–70 wt-% hydroxyl-group containing polymers with hydroxyl-numbers between 40 and 240 and polyisocyanates blocked with cyclic amidines of the general formula

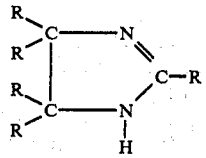

wherein R=equal or different substituents, selected from the group of hydrogen, alkyl-, cycloalkyl-, aralkyl- and aryl-radical, whereby the components are used in such amounts that 0.8–1.2 NCO-groups are applied per hydroxyl group equivalent.

b. 0–2 wt-% of cross-linking catalyst, c. 30–60 wt-% of organic solvent or solvent mixture, whereby the percentages add up to 100 as well as, in addition:

d. 0–65 wt-% pigments and/or fillers e. 0–5 wt-% colorants and, possibly f. 0.1 to 3 wt-% of flowing agents, gloss improvers, antioxidants and/or heat stabilizers.

These effects are obtained by the replacement of the ε-caprolactam by the indicated imidazolines as blocking agents.

DETAILED DESCRIPTION OF THE PREFERRED EMBODIMENTS

The imidazoline-blocked polyisocyanates are readily compatible with the hydroxyl-group containing polymers and produce homogeneous solutions in organic solvents. These solutions are very well suited to application as baking laquers. The hardenable mixtures according to this invention are very storage-stable at room temperature, i.e. they neither change physically nor chemically, i.e. the components of the baking lacquers do not react at room temperature. Hardening of the lacquers according to this invention takes place in the temperature range between 140° and 350° C. within 25 minutes and down to 15 seconds. A deblocking of the hardeners into the cyclic amidines and the polyisocyanates takes place during hardening. The liberated NCO-groups then react with the OH-groups of the polyester by way of an NCO—OH—reaction with formation of urethane bonds. The hardened coating or coverings are characterized by very good chemical and mechanical properties as well as resistance to chemicals.

Preferred as the hydroxyl-group containing polymers, useful according to this invention, are hydroxyl-group containing polyesters from aliphatic, cycloaliphatic and/or aromatic poly-carboxylic acids with hydroxyl numbers between 40 and 240. For this purpose, the polyesters should, further, have a low glass transition point, i.e. between 20° C. and −25° C., preferably 0° C. Beyond this, the suitable polymers have, on the average, more than 1 OH-group per molecule.

The following are suitable aliphatic, cycloaliphatic and aromatic polycarboxylic acids. In these cases, the aromatic ones may be mono- or polynuclear. They are for example, oxalic acid, succinic acid, glutaric acid, 2,2-dimethyl glutaric acid, adipic acid, 2,2,4-or 2,4,4-trimethyl adipic acid, sebacic acid, dodecan-dicarboxylic acid, terephthalic acid, methyl-terephthalic acid, 2,5 and 2,6 dimethyl-tetephthalic acid, chloro-terephthalic acid, 2,5-dichloro-terephthalic acid, fluoro-terephthalic acid, isophthalic acid, phthalic acid, trimellithic acid, naphthalene dicarboxylic acid, , especially the 1,4-, 1,5-, 2,6- and 2,7-isomers, phenylene diacetic acid, 4-carboxy-phenoxy acetic acid, m- and p-terphenyl-4,4″-dicarboxylic acid, dodecahydrodiphenic acid, tetrahydrophthalic acid, hexahydrophthalic acid, hexahydroterephthalic acid, 4,4′-diphenic acid, 2,2′- and 3,3′- dimethyl-4,4′diphenic acid, 2,2′-dibromo-4,4′-diphenic acid, bis-(4-carboxyphenyl)-methane, 1,1 and 1,2-bis-(4-carboxyphenyl)ethane, 2,2-bis-(4-carboxyphenyl)-propane, 1,2-bis-(4-carboxyphenoxy)-ethane, bis-4-carboxyphenyl-ether, bis-4-carboxyphenyl sulfide, bis-4-carboxyphenyl ketone, bis-4-carboxyphenyl sulfoxide, bis-4-carboxyphenyl sulfone, 2,8-dibenzofuran dicarboxylic acid, 4,4′-stilbenedicarboxylic acid and octadecahydrom-terphenyl-4,4"-dicarboxylic acid among others. Unsaturated acids that can be derived from the above-mentioned acids, can also be used. Naturally, it is also possible to use, instead of the mentioned acids, also their functional derivatives, such as anhydrides, esters etc. It is also possible to use mixtures of the previously mentioned compounds. Diols are preferably used as alcohol components for the production of the hydroxyl-group containing polyesters. The partial co-use of other polyols, e.g triols, is possible. Examples for suitable diols are: ethylene glycol, propylene glycol, such as 1,2-and 1,3-propanediol as well as 2,2-dimethylpropane diol-(1,3), butane diols, such as butane diol-(1,3) or (1,4), hexane diols, e.g. hexanediol-(1,6), heptane diol-(1,7), thiodiglycol, octadecane diol-(1,18), 2,4-dimethyl-2-propyl-heptane diol-(1,3), butene- or butyne-diol-(1,4), diethylene glycol, triethylene glycol, cis- and trans-1,4-cyclohexane dimethanol, 1,4-cyclohexane diols, 2,2-bis-(4-hydroxy-cyclohexyl)-propane, bisoxy-ethylated 2,2-bis-(4hydroxyphenyl)-propane; for other polyols: glycerine, hexanetriol-(1,2,6), 1,1,1-trimethylol propane, 1,1,1-trimethylol ethane, pentaerithrite and others. Mixtures of the previously indicated compounds can also be used.

In the production of the polyesters, the polyol is used in such amounts that more than 1 OH-group-equivalents are present for each carboxyl-group-equivalent, so that polyesters of the described characteristics are obtained. The polyesters obtained represent liquids of higher viscosities or soft resins.

The hydroxyl-group containing polyesters can be produced in the known and usual manner, i.e. by esterification or trans-esterification, possibly in the presence of catalysts. The following processes are particularly useful for the purpose. In the first case, one starts, for example, with a mineral-acid-free acid which may have to be purified by recrystallization. The acid-alcohol equivalent ratio naturally depends on the desired size of the molecules and on the required OH-number. The reaction components are heated in a suitable apparatus under throughput of an inert gas, e.g. nitrogen. This is done after addition of 0.005 to 0.5 wt-%, preferably 0.05 to 0.2 wt-% of a catalyst, e.g. tin compounds, such as di-n-butyl tin oxide, di-n-butyl tin diester and others, or of titanium ester, especially tetraisopropyl titanate. Depending on the acid used, there will first result water separation. The water is removed from the reaction mixture by distillation. Over the course of several hours, the reaction temperature is raised to 240° C. The reaction medium remains usually, inhomogeneous until shortly prior to complete esterification. The reaction is completed after 24 hours.

In the second procedure, one starts, for example, with the dimethyl ester or some other ester and trans-esterifies with throughflow of an inert gas, e.g. dry nitrogen, with the desired alcohol components. Again, titanium ester, dialkyl tin ester or dialkyl tin oxides can be used in concentrations of 0.005 to 0.5 wt-% as trans-esterification catalysts. After a temperature of about 120° C. has been reached, the first methanol separation usually takes place. The temperature is raised to 220° to 230° C. over a period of several hours. Depending upon the selected materials, trans-esterification is completed after 2 to 24 hours.

The polyisocyanates that are used according to this invention, and that are blocked with cyclic amidines of the described general formula, can be produced by conversion at temperatures of between 0° and 150° C., preferably at 80°–120° C. In this case, the polyisocyanates and the cyclic amidines are used in such proportions, that 0.6–1.1, preferably 0.8–1.0 mol of cyclic amidine is used for each isocyanate group. The applied reaction temperature should however be below the decomposition temperature of the adducts. The conversion can be carried out in solvents as well as in the melt in an excess of provided polyisocyanates.

The starting compounds that can be used for blocking with the cyclic amidines are, e.g., the following which are suitable: Polyisocyanates, especially diisocyanates, such as aliphatic and/or aromatic diisocyanates, such as they are, for example, described in Houben-Weyl "Methods of organic chemistry", vol. 14/2, pp 61 to 70 as well as in the paper by W. Siefken in Justus Liebig's Annalen der Chemie 562, 75–136. These are: 1,2-ethylene diisocyanate; 1,4-tetramethylene diisocyanate; 1,6-hexamethylene diisocyanate; 2,2,4- or 2,4,4-trimethyl-1,6-hexamethylene diisocyanate (TMDI); dodecane diisocyanate-1,12; $\omega,\omega'$-diisocyanato-dipropyl ether; cyclobutane-1,3-diisocyanate; cyclohexane-1,3- and 1,4-diisocyanate; 3-isocyanatomethyl-3,5,5-trimethyl cyclohexyl isocyanate, which is also described as isophorondiisocyanate and abbreviated with IPDI; decahydro-8-methyl-(1,4-methano-naphthaline-3 (or -3); 5-ylene-dimethylene-diisocyanate; hexahydro-4,7-methano-indane-1 (or 2)-5 (or -6) ylene-dimethylene-diisocyanate; hexahydro-4,7-methanoindane-1 (or -2) 5 (or -6 ylene-diisocyanate; hexahydro-1,3 or 1,4-phenylene diisocyanate; 2,4-, and 2,6-hexahydrotolulylene diisocyanate; perhydro-2,4'- and/or -4,4'-diphenyl methane diisocyanate, $\omega,\omega'$-diisocyanato-1,4-diethyl benzene, 1,4-phenylene diisocyanate, 4,4'-diisocyanato-3,3-dichlorophenyl, 4,4'-diisocyanato-3,3'-dimethoxy-diphenyl; 4,4'-diisocyanato-3,3'-dimethyl diphenyl; 4,4'-diisocyanato-3,3'-diphenyl-diphenyl; 4,4'-diisocyanato-diphenyl methane; naphthalene-1,5-diisocyanate; toluylene-diisocyanate; toluylene-2,4- or 2,6-diisocyanate, N,N'-(4,4'-dimethyl-3,3'-diisocyanatodiphenyl)-uretdione; m-xylylene-diisocyanate; and also the triisocyanates, such as 2,4,4'-triisocyanato-diphenyl ether; 4,4',4''-triisocyanato-triphenylmethane, tri-(4-isocyanato-phenyl)-thiophosphate; as well as any conceivable mixtures of these compounds. Additional suitable isocyanates are described in the mentioned paper in the "Annals" on page 122 f. Generally preferred are, as a rule, the technically easily accessible aliphatic, cycloaliphatic or aromatic diisocyanates and, especially 3-isocyanato-methyl-3,5,5-trimethyl cyclohexyl diisocyanate and 2,4- (or 2,6-) toluylene diisocyanate as well as their isomeric mixtures.

Along with the monomeric polycyanates, naturally also the dimeric and trimeric forms of the polyisocyanates, such as uretdiones, biuret and isocyanurates and urethane adducts which can be produced according to known methods, can be used as starting materials for blocking with the imidazolines that will thoroughly be described in the following.

Polyisocyanates, in the sense of the present invention, are also those that have been subjected, prior to blocking with the imidazolines, to a reaction for molecular enlargement with chain lengthening products that are usual in isocyanate chemistry, such as water, polyols polyamines and others. In this case, the bi- or tri-functional chain lengthening product, i.e. such as have groups that are reactive towards isocyanate groups, such as hydroxyl- and/or amino-groups, are used in such amounts, that the resulting, new isocyanate bears, on the average, at least two isocyanate groups. When using water as a chain lengthening product, polyisocyanates with one or several ureido groups will result Suitable polyols are, for example, diols and triols, or other polyols that are also capable of being used for the production of the hydroxyl-group containing polyesters.

Of the polyamines that are suitable for chain lengthening, or molecular enlargement, the following are to be mentioned as examples. These are: ethylene diamine-1,2; propylene diamine-1,2 and 1,3; butylene dimanine-1,2; -1,3 and 1,4 as well as hexamethylene diamines that may also carry one or several $C_1$-$C_4$ alkyl radicals; such as 2,2,4-, or 2,4,4-trimethyl-hexamethylene diamine-1,6 and others; and 3-aminomethyl-3,5,5-trimethylcyclohexyl amine; which is also designated as IPD.

Suitable imidazoline-derivatives in the sense of this invention and that correspond to the earlier-described general formula are, for example, those with possibly aryl-substituted alkyl radicals, like 2- or 4-methylimidazoline; 2,4-dimethyl-imidazoline, 2-methyl-4-(n-butyl)-imidazoline; 2-ethyl-imidazoline; 2-ethyl-4-methyl-imidazoline; 2-benzyl-imidazoline; 2-phenyl-imidazoline; 2-phenyl-4-methyl-imidazoline; 2-phenyl-4-(N-morpholinyl-methyl)-imidazoline; 2-(o-tolyl)-imidazoline; 2-(p-tolyl)-imidazoline as well as others. According to the invention, it is also possible to use mixtures of the imidazoline-derivatives. These are especially useful, when blocked isocyanates with low melting points, or melting point ranges are required.

The imidazoline-derivatives that can be used according to this invention, can be produced according to known processes from, possibly substituted diamines and aliphatic or aromatic mononitriles in the presence of elemental sulfur or sulfuryl chloride as catalysts.

Blocking, as already mentioned, can also be carried out in solvents. Useful as solvents for this reaction are only those that do not react with the isocyanate groups. Examples of these are ketones, like acetone, methyl-ethyl ketone, methyl isobutyl ketone, cyclopentanone, cyclohexanone and isophoron, among others; aromatics, such as benzene, toluene, xylene, chlorobenzene, nitrobenzene and others; cyclic ethers, such as tetrahydrofuran, dioxane and others; esters, like methyl-acetate, n-butyl acetate, and others; aliphatic chlorinated hydrocarbons, like chloroform, carbon tetrachloride and others, as well as sprotic solvents, like dimethylformamide, dimethyl acetamide, dimethyl sulfoxide and others, are also useful as solvents. For the blocking reaction, it is appropriate to use the same solvents or solvent mixtures that will, later, be used for the production of the baking lacquers because this eliminates solvent removal at that time.

If the blocking material is used in the ratio of ≦1 to the isocyanate groups, the reaction mixtures are held at the indicated temperatures until the NCO-content of the reaction mixture has dropped to values of less than 0.2% NCO; and for ratios <1 up to obtention of a constant NCO-value.

Also applicable, according to this invention, are such blocked polyisocyanates as can be obtained by subsequent reaction of a group of blocked polyisocyanates.

These are materials, in which cyclic amidines have been used in less than stoichiometric amounts, i.e. the ratio between cyclic amidine and isocyanate groups is <1:1, with the same chain lengthening materials that have, earlier, been described as materials for molecular enlargement. The transformation also takes place at temperatures in the range of 20° to 150° C., preferably 80°–120° C., but always below the deblocking temperature of the blocked polyisocyanate. By the use of these blocked polyisocyanates, baking lacquers can be produced that are capable of covering a wide range of requirements. This process variation is of special interest for polyisocyanates with differently-reactive NCO-groups.

In this manner it is possible to obtain, by the change of the sequence:adduct formation/blocking, polyisocyanates with differing reactivity, melting range and structure.

For the blocking or diisocyanates and, possibly prior or subsequent transformation with di -valent chain lengthening materials, compounds are obtained that can be described by the following formula:

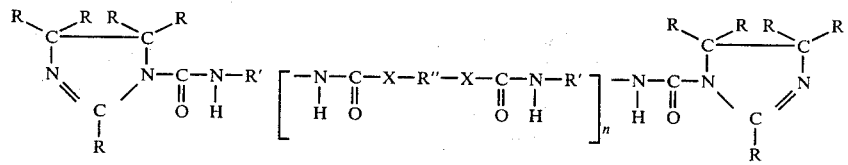

In this general formula the following meanings can be assigned: n=0 or 1; X=O, S or an NH-group, R=an equal or different radical out of the group Hydrogen, alkyl-, cycloalkyl-,aralkyl- and aryl radical, R'=an alkylene-, cycloalkylene-, such as the

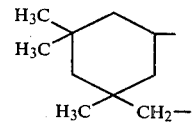

radical or arylene radical and R''=an alkylene radical with 2 to 18 C-atoms, which, possibly, is substituted by one or more alkyl radicals, whereby more than one can jointly form a cycloaliphatic ring. The alkylene radical can also be saturated or unsaturated and it can, possibly, also contain one or several oxygen- or sulfur-atoms in the hydrocarbon chain, or it is a cycloalkylene radical.

Solvents, suitable for the single-component baking lacquers according to this invention are those with a boiling point of at least 100° C. or higher. The boiling temperature of the solvent used is dependent upon the specific baking temperatures. The higher these are, the higher may also be the boiling temperatures of the applied solvents. The following compounds are useful as solvents:

Aromatic hydrocarbons like toluene, xylenes (including technical mixtures), tetrahydronaphthalene, cumene and others; ketones like methyl-isobutyl ketone, diisobutyl ketone, isophoron and esters like n-hexylacetate, ethyl ethylene glycol acetate, n-butyl ethylene-glycol acetate etc. The mentioned compounds can also be used in the form of mixtures.

So-called flowing agents are added during production in order to improve the flow properties of the lacquers. These products can be chemical compounds or their mixtures. These may be for example, polymeric or monomeric compounds, acetals like polyvinylformal, polyvinyl acetal, polyvinyl butyral, polyvinyl acetobutyral, or
di-2-ethylhexyl -i-butyraldehyde-acetal
di-2-ethylhexyl -n-butyraldehyde-acetal
diethyl-2-ethylhexanol-acetal
di-n-butyl-2-ethyl-hexanol-acetal
di-i-butyl-2-ethyl-hexanol-acetal
di-2-ethylhexyl-acetaldehyde-acetal and others, ethers, like the polymeric polyethylene- and polypropylene-glycols, co-polymers of n-butylacrylate and vinylisobutyl ether, ketone-aldehyde condensation resins, solid silicone resins, silicone oils, or also mixtures of saponified zinc compounds, of fatty acids and of aromatic carboxylic acids and others. Such flowing agents may be contained in the mixture up to 3 wt-%, relative to the total amount of binders (Polyesters+blocked polyisocyanate), they may also be contained in the crosslinking catalyst and solvent, or their mixtures.

The transformation of the hydroxyl-group containing polyester with the polyisocyanates that are liberated by deblocking, can be accelerated by catalysts in the indicated amounts. Examples for catalysts are, on the one hand, organic sulfonic acids, p-toluene sulfonic acid; on the other hand, they can be organic tin compounds, like di-n-butyl-tin-dilaurate.

The other components of the baking lacquers, such as colorants, pigments, fillers, like titanium dioxide, carbon black, organic and inorganic color pigments, talcum, barytes and others, thixotropic materials, UV- and oxidation-stabilizers and others, may fluctuate, relative to the amount of binder (polyester+blocked polyisocyanate), crosslinking catalyst and solvent, or solvent mixture, within the given range.

The single-component baking lacquers of this invention can be produced in suitable aggregate mixers, e.g. agitator kettles, by simple mixing of the three lacquer components: hydroxyl-group containing polyester, blocked polyisocyanate and high boiling point solvent or solvent-mixture at 80° to 100° C. The usual additive materials, such as pigments, flowing agents, gloss improvers, antioxidants and heat stabilizers can also be added to the lacquer solution in a simple manner.

The application of the single-component baking lacquers to the bodies to be painted can take place in the usual manner.

After application of the lacquer according to one of the known methods onto the objects to be laquered, these are heated for hardening to temperatures above the decomposition temperature of the hardener, i.e. 140° to 350° C., preferably 200° to 300° C. After this, the resulting coating shows the described advantages.

For coating with the single-component baking lacquers, all substrates are suitable that can tolerate the indicated temperatures without loss of their mechanical properties, such as metal surfaces, glass etc.

The lacquers of this invention find their primary application in coil-coating lacquering for weather-resistant single- and double-layer lacquering.

Having generally described this invention, a further understanding can be obtained by reference certain specific examples which are provided herein for purposes of illustration only and are not intended to be limiting unless otherwise specified.

EXAMPLE 1

1a. Production of the blocked isocyanate:

To 444 parts by weight of IPDI, slowly added 106 parts by weight of diethylene glycol at 80° C. and with good stirring. After completing diethylene glycol addition, heating continued for additional 2 hours at 80° C. After this, the NCO-content of the IPDI/diethylene glycol material was 15.1%.

1b. To 556 parts by weight of the material, produced under 1a from 2 mols IPDI and 1 mol diethylene glycol, were added 292 parts by weight of 2-phenylimidazoline at 120° C. in such a way that the temperature did not rise above 125° C. After completion of the 2-phenylimidazoline-addition, the reaction mixture was heated for a further 1 hour at 120° C. The reaction mixture is a pale-yellow powder with a melting range between 100° and 106° C.

1c. Production of the hydroxyl-group containing polyester:

7 mol (1162 grams) isophthalic acid, 6 mol (708 grams) hexanediol, 2 mol (268 grams) trimethylol propane were melted in a 5-liter three-neck bottle with reflux cooler, stirrer and thermometer. At a temperature of 160° C. 0.1 wt-% of di-n-butyltin oxide was added as the esterification catalyst. The temperature was slowly raised over 4 hours to 185° C. The further heat increase to a maximum of 230° C. temperature took place within a further 8 hours, whereby the speed of heating was gauged by the water separation. The polyester was subsequently cooled to about 200° C. and largely freed of volatile constituents by means of evacuation at about 1 mm Hg. The product was stirred throughout the entire condensation period. A dry nitrogen flow took care of the rapid removal of water.
OH-number: 105 mg KOH/g
acid number: <1
Glass transition temperature: −12° to +5° C.
average molecular weight: 2400
The average molecular weights of the polyesters were determined by end-group determination.

1d. Preparation of the clear lacquer 42 parts by weight of the compounds described in 1b were dissolved in 28 parts by weight of a solvent mixture of 1 part by weight of o-xylene and 3 parts by weight of ethylglycol acetate (EGA). Added to this solution with good stirring were a solution of 53.3 parts by weight of the hydroxyl-group containing polyester according to 1c and 35.5 parts by weight of a solvent mixture of 1 part by weight of o-xylene and 3 parts by weight of EGA.

The lacquer solution, thus produced, did not alter during storage.

1 mm thick steel sheets were coated with this lacquer solution and hardened in a recycling air drying cabinet.

| Baking Conditions | | Mechanical Data | | | | | |
|---|---|---|---|---|---|---|---|
| Temp./Time | | FT | HK | HB | GT | EP | Impact rev. |
| 180 | 10' | 40–50 | 180 | 111 | 0 | 11.2 | <82 |
| 175 | 15' | 35–40 | 170 | 100 | 1 | 10.3 | <82 |

EXAMPLE 2

2a. Preparation of the blocked isocyanate

To 556 parts by weight of the IPDI/diethylene glycol material described in example 1b, were added 320 parts by weight of 2-phenyl-4-methyl-imidazolin at 100°

C. in such a manner that the temperature of the reaction mixture did not rise above 110° C. In order to complete the reaction, the reaction mixture was additionally heated for 2 hours at 110° C. The reaction product is a white powder with a melting range between 95° and 100° C. NCO could not be detected in the reaction product.

2b. Preparation of the clear lacquer

The compound described in 2a was dissolved in equivalent ratio with the hydroxyl-group containing polyester, described in 1c, in o-xylene/EGA (o-xylene: EGA=1:3) and further treated as in 1c.
Composition: 100 parts by weight blocked isocyanates from 2a.
66.6 parts by weight of polyester according to 1c
81.6 parts by weight o-xylene/EGA

| Baking Conditions | | Mechanical Data | | | | |
|---|---|---|---|---|---|---|
| Temp./Time | FT | HK | HB | GT | EP | Impact rev. |
| 180  15' | 40–50 | 180 | 111 | 0 | 10.8 | <82 |

EXAMPLE 3

3a. Preparation of the blocked isocyanate

To 556 parts by weight of the product described in example 1a of 2 mol IPDI and 1 mol diethylene glycol, were dropwise added 96 parts by weight of 2,4-dimethyl-imidazoline at 100° C. in such a manner that the temperature did not rise above 110° C. After completed addition of 2,4-dimethyl imidazoline, the reaction mixture was further heated for 2 hours at 110° C. In the reaction product, thus produced, no NCO could be detected. The reaction product is a colorless powder with a melting range between 100° and 107° C.

3b. Preparation of the clear lacquer

The compound, described under 3a was dissolved on o-xylene/EGA in equivalent relationship with the hydroxyl-group containing polyester, as described in 1c, and further treated as described in 1c.
Composition: 100 parts by weight of blocked isocyanate from 3a
66.6 parts by weight o-xylene/EGA
142.9 parts by weight polyester according to 1c,
95.2 parts by weight o-xylene/EGA

| Baking Conditions | | Mechanical Data | | | | |
|---|---|---|---|---|---|---|
| Temp./Time | FT | HK | HB | GT | EP | Impact rev. |
| 240  2' | 45 | 180 | 100 | 0 | 10.5 | <82 |

EXAMPLE 4

4a. Preparation of the blocked isocyanate

Slowly added to a mixture of 222 parts by weight of isophorondiisocyanate (IPDI) and 300 parts by weight of water-free acetone, were 292 parts by weight of 2-phenyl-imidazoline that had been dissolved in 500 parts by weight of water-free acetone, at room temperature. After completion of the dropwise addition of 2-phenyl-imidazoline, the material was heated for 1 hour at 50° C. The acetone was distilled off. The last remainders of acetone were removed by drying the reaction product at 60° C. in a vacuum drying cabinet. The 2-phenyl-imidazoline-blocked IPDI is a white powder with a melting range between 98° and 106° C.

4b. Preparation of the clear lacquer

The compound, described under 4a was dissolved in o-xylene/EGA in equivalent ratio with the hydroxyl-group containing polyester as described in 1c and then treated as in 1c.
Composition:
100 parts by weight blocked isocyanate from 4a
66.6 parts by weight of o-xylene/EGA
207.2 parts by weight polyester according to 1c
138.1 parts by weight o-xylene/EGA.

| Baking Conditions | | Mechanical Data | | | | |
|---|---|---|---|---|---|---|
| Temp./Time | FT | HK | HB | GT | EP | Impact rev. |
| 180  15' | 40–50 | 190 | 111 | 0 | 11.2 | <82 |

EXAMPLE 5

5a. Preparation of the blocked isocyanate

Slowly added to a mixture of 174 parts by weight of toluylene-2,4- (2,6-) diisocyanate (from 80% 2,4-and 20% 2,6-) and 300 parts by weight of water-free acetone at room temperature, were 197 parts by weight of 2,4-dimethylimidazoline that had been dissolved in 500 parts by weight of water-free acetone. After completion of the drop-wise addition of the 2,4-dimethylimidazoline, the material was heated for 1 hour to 50° C. Acetone was distilled off. The last remainders of the acetone were removed by drying the reaction product at 60° C. in a vacuum drying cabinet. The NCO-content of the blocked TDI was 0.2%. The 2,4-dimethylimidazoline-blocked diisocyanate is a white powder with a melting range between 85° and 105° C.

5b. Preparation of the clear lacquer

The compound, as described in 5a was dissolved in o-xylene/EGA with the polyester described in 1c (o-xylene:EGA=1:3) and then treated as in 1c.
Composition:
100 parts by weight blocked isocyanate from 5a
66.6 parts by weight o-xylene/EGA
288 parts by weight polyester according 1c
192 parts by weight o-xylene/EGA

| Baking Conditions | | Mechanical Data | | | | |
|---|---|---|---|---|---|---|
| Temp./Time | FT | HK | HB | GT | EP | Impact rev. |
| 180  5' | 40–50 | 190 | 111 | 0 | 11 | <82 |

EXAMPLE 6

6a. Preparation of the polyester 2 mol (268 grams) trimethylol propane, 6 mol (708 grams) hexanediol-1,6, 1 mol (104 grams) 2,2-dimethyl-propanol diol-1,3, 2 mol (292 grams) adipic acid and 5 mol (830 grams) isophthalic acid were warmed in a 5-liter three-neck bottle. After the introduced material had largely melted, 0.1 wt-% di-n-butyl-tinoxide was added at a temperature of 160° C. as esterification catalyst. Over a period of 3 hours, the temperature was slowly raised to 185° C. The further temperature increase to a maximum temperature of 230° C., took place within a further 8 hours, whereby the heating speed was gauged on the basis of water separation. The polyester was subsequently cooled to 210° C. and largely freed of volatile components by evacuation under about 1 mm Hg. The product was slowly stirred throughout the entire condensation period. A dry N₂-flow of about 30 liters/hour provided for improved water removal.

OH-number: 118-123 mg KOH/g
Acid number: 2 mg KOH/g
Melting range 25° to 36° C.
Glass transition temperature (DTA): −14° to −3° C.

6b. Preparation of the clear lacquer

The compound, described in 5a was dissolved in an equivalent ratio with the polyester described in 6a, in o-xylene/EGA (o-xylene: EGA = 1:3) and then further treated as in 1c.

Composition:
100 Parts by weight blocked isocyanate from 5a
66.6 parts by weight o-xylene/EGA
252.6 parts by weight polyester according to 6a,
168.5 parts by weight o-xylene/EGA

| Baking Conditions | | Mechanical Data | | | | | |
|---|---|---|---|---|---|---|---|
| Temp./Time | | FT | HK | HB | GT | EP | Impact rev. |
| 170 | 15' | 35–40 | 160 | 100 | 0 | 11 | <82 |

EXAMPLE 7

The blocked polyisocyanate, described under 1b was dissolved, together with the polyester, as described under 6a, in equivalent ratio with o-xylene/EGA (o-xylene:EGA = 1:3) and further treated as in 1c.

Composition:
100 parts by weight blocked polyisicyanate from 1b,
66.6 parts by weight o-xylene/EGA
111 parts by weight polyester according to 6a
74 parts by weight o-xylene/EGA.

| Baking Conditions | | Mechanical Data | | | | | |
|---|---|---|---|---|---|---|---|
| Temp./Time | | FT | HK | HB | GT | EP | Impact rev. |
| 180 | 10' | 40–50 | 150 | 100 | 0 | 11.0 | <82 |
| 170 | 15' | 40–50 | 145 | 91 | 0 | 10.5 | <82 |

EXAMPLE 8

8a. Preparation of the blocked isocyanate

To 210 parts by weight of 2,2,4- (2,4,4-) trimethylhexamethylenediisocyanate (1:1) were added drop-wise 196 parts by weight of 2,4-dimethyl-imidazoline at 80° C. in such a manner that the temperature did not rise above 90° C. After completing 2,4-dimethyl-imidazoline-addition, the materials was further heated for another hour at 100° C. The NCO-content of the reaction product was at <0.2%. The reaction product is a colorless powder with a melting range between 85° and 105° C.

8b. Preparation of the clear lacquer

The compound, described in 8a was dissolved in equivalent ratio with the polyester, described in 1c, in o-xylene/EGA (o-xylene:EGA = 1:3) and further treated as in 1c.

Composition:
100 parts by weight blocked polyisocyanate from 8a.
66.6 parts by weight o-xylene/EGA
230.3 parts by weight polyester according to 1c,
153.3 parts by weight o-xylene/EGA

| Baking Conditions | | Mechanical Data | | | | | |
|---|---|---|---|---|---|---|---|
| Temp./Time | | FT | HK | HB | GT | EP | Impact rev. |
| 180 | 10' | 40–50 | 150 | 100 | 0 | 11.0 | <82 |
| 170 | 15' | 40–50 | 145 | 91 | 0 | 10.5 | <82 |

The abbreviations used in the tables are as follows:

| FT | = film thickness | |
|---|---|---|
| HK | = hardness (Konig) (in sec.) | (DIN 53 157) |
| HB | = hardness (Buchholz) | (DIN 53 153) |
| EP | = penetration (Erichsen) (in mm) | (DIN 53 156) |
| GT | = grid cut test | (DIN 53 151) |
| Impact rev. | = impact reverse in ich lb. | |

Having now fully described this invention, it will be apparent to one of ordinary skill in the art that many changes and modifications can be made thereto without departing from the spirit or scope of the invention set-forth herein.

What is claimed as new and intended to be covered by Letters Patent is:

1. Baking lacquers which are a blend of hydroxy-group-containing polymers, blocked polyisocyanates and organic solvents, which comprise:

a. 40 to 70 wt.% hydroxyl-group-containing polymers with hydroxyl numbers between 40 and 240 and polyisocyanates blocked with cyclic amidines of the formula:

$$\begin{array}{c} R \\ \diagdown \\ R \diagup C \text{———} N \\ \phantom{R} \phantom{\diagup} | \phantom{XX} \diagdown \\ \phantom{R} \phantom{\diagup} | \phantom{XXXX} C\text{—}R \\ R \phantom{\diagup} | \phantom{XX} \diagup \\ \diagdown C \text{———} N \\ R \diagup \phantom{XXX} | \\ \phantom{XXXXX} H \end{array}$$

wherein R are equal or different substituents selected from the group consisting of hydrogen, alkyl-, cycloalkyl-, aralkyl- and aryl radicals whereby the components are used in such amounts that 0.8 to 1.2 NCO-group equivalents are applied for each hydroxyl group equivalent, b. 0–2 wt.% cross-linking catalyst, c. 30–60 wt.% of an organic solvent or solvent mixture whereby the percentages of polymer, catalyst and solvent add up to 100, as well as in addition:

d. 0–65 wt.% of pigments or fillers or mixtures thereof, e. 0–5 wt.% colorants and, optionally f. 0.1–3 wt.% flowing agents, gloss improvers, antioxidants or heat stabilizers or mixtures thereof.

2. Baking lacquers according to claim 1, wherein said blocked diisocyanate, has the formula:

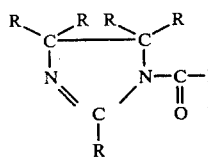 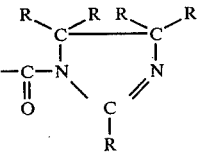

wherein n=0 or 1, X=0, S or an NH-group, R=equal or different radicals selected from the group consisting of hydrogen, alkyl-, cycloalkyl-, aralkyl-, and aryl radicals; R'=an alkylene, cycloalkylene- or arylene-radical and R" represents a substituted saturated or unsaturated alkylene radical with 2 to 18 C-atoms optionally substituted by one or several alkyl radicals, wherein more than one can also jointly form a component of a cycloaliphatic ring; said alkylene radical optionally containing one or several oxygen- or sulfur- atoms in the hydrogen carbon chain or it may be a cycloalkylene radical.

3. The lacquers of claim 1 wherein said blocked polyisocyanate is a blocked diisocyanate.

4. The backing lacquer of claim 1 wherein said hydroxy-group-containing polymer is a hydroxy-group-containing polyester with a glass transition temperature between 20° and −25° C.

5. The lacquer of claim 4 wherein said polyester has at least one free hydroxy group per molecule.

6. The lacquers of claim 1 wherein said polyisocyanate has been pretreated with a chain lengthening agent selected from the group consisting of water, polyols and polyamines, and wherein thus treated polyisocyanate has at least two free isocyanate groups per molecule.

7. The lacquers of claim 1 wherein said solvent has a boiling point higher than 100° C.

* * * * *